United States Patent
Gehwolf et al.

(10) Patent No.: US 8,883,933 B2
(45) Date of Patent: Nov. 11, 2014

(54) FILTER ELEMENT AND PROCESS FOR PRODUCING A FILTER ELEMENT

(71) Applicant: Mann+Hummel GMBH, Ludwigsburg (DE)

(72) Inventors: Klaus Gehwolf, Mamming (DE); Tanja Majer, Ingersheim (DE); Gelase Mbadinga-Mouanda, Karlsruhe (DE)

(73) Assignee: Mamm+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/751,805

(22) Filed: Jan. 28, 2013

(65) Prior Publication Data

US 2013/0139947 A1 Jun. 6, 2013

Related U.S. Application Data

(63) Continuation of application No. PCT/EP2011/062785, filed on Jul. 26, 2011.

(30) Foreign Application Priority Data

Jul. 26, 2010 (DE) .......... 10 2010 032 294

(51) Int. Cl.
| | |
|---|---|
| C08L 67/02 | (2006.01) |
| C08L 77/06 | (2006.01) |
| C09J 167/02 | (2006.01) |
| C09J 177/00 | (2006.01) |
| C09J 177/06 | (2006.01) |
| C08L 77/00 | (2006.01) |

(52) U.S. Cl.
CPC ............... *C09J 167/02* (2013.01); *C08L 67/02* (2013.01); *C09J 177/00* (2013.01); *C08L 77/00* (2013.01)
USPC ......................................... 525/425

(58) Field of Classification Search
CPC ......... C08L 67/02; C08L 77/00; C08L 77/06; C09J 167/02; C09J 177/00; C09J 177/06; C09J 9/005
USPC ......................................... 525/425
See application file for complete search history.

(56) References Cited

U.S. PATENT DOCUMENTS

| | | | | |
|---|---|---|---|---|
| 4,066,587 | A | * | 1/1978 | Mains et al. ............... 525/420.5 |
| 4,137,366 | A | * | 1/1979 | Harada et al. ............... 428/157 |
| 4,217,435 | A | * | 8/1980 | McConnell et al. ......... 525/425 |
| 4,363,853 | A | * | 12/1982 | Imamura et al. ............. 428/480 |

(Continued)

FOREIGN PATENT DOCUMENTS

| | | | | |
|---|---|---|---|---|
| CA | | 845279 A | * | 6/1970 |
| DE | | 1299230 B | | 7/1969 |

(Continued)

OTHER PUBLICATIONS

Par Group (Nylon 12, Par Group, Jan. 2007, 3 pages).*

(Continued)

*Primary Examiner* — Brieann R Fink
(74) *Attorney, Agent, or Firm* — James Hasselbeck

(57) ABSTRACT

The invention relates to a hotmelt adhesive including a hot-melt adhesive mixture, the mixture having a 15-85% by weight of a first polyester-based hotmelt adhesive and a 15-85% by weight of a second, polyamide-based hotmelt adhesive.

13 Claims, 1 Drawing Sheet

(56) References Cited

U.S. PATENT DOCUMENTS

| | | | |
|---|---|---|---|
| 4,740,055 A * | 4/1988 | Kanda et al. | 385/141 |
| 4,776,916 A * | 10/1988 | Prunesti et al. | 156/291 |
| 4,891,264 A | 1/1990 | Daimon et al. | |
| 5,071,555 A | 12/1991 | Enbom | |
| 5,902,843 A * | 5/1999 | Simon et al. | 523/453 |
| 2006/0029820 A1* | 2/2006 | Miller | 428/474.4 |
| 2008/0132625 A1 | 6/2008 | Niehaus | |
| 2010/0168260 A1 | 7/2010 | Frenzel et al. | |
| 2011/0054074 A1 | 3/2011 | Jonschker et al. | |

FOREIGN PATENT DOCUMENTS

| | | | |
|---|---|---|---|
| DE | 10015951 A1 | 12/1999 | |
| DE | 10113077 A1 | 4/2002 | |
| EP | 1454957 A1 * | 9/2004 | |
| JP | 58017184 A * | 2/1983 | |
| JP | 60233174 A * | 11/1985 | |
| WO | WO9935189 A2 | 7/1999 | |

OTHER PUBLICATIONS

PES Series (Hot melt adhesive: ARON MELT PES Series, Mar. 2006, 4 pages).*

CAPlus Abstract of JP 60-233174 (AN 1986:208506, Entered Jun. 14, 1986, 1 page).*

Google Translation of Section 3 (p. 2) of JP 60-233174 (Mar. 2014, 1 page).*

The machine translated English equivalent of JP 58-017184 (Mar. 2014, 6 pages).*

* cited by examiner

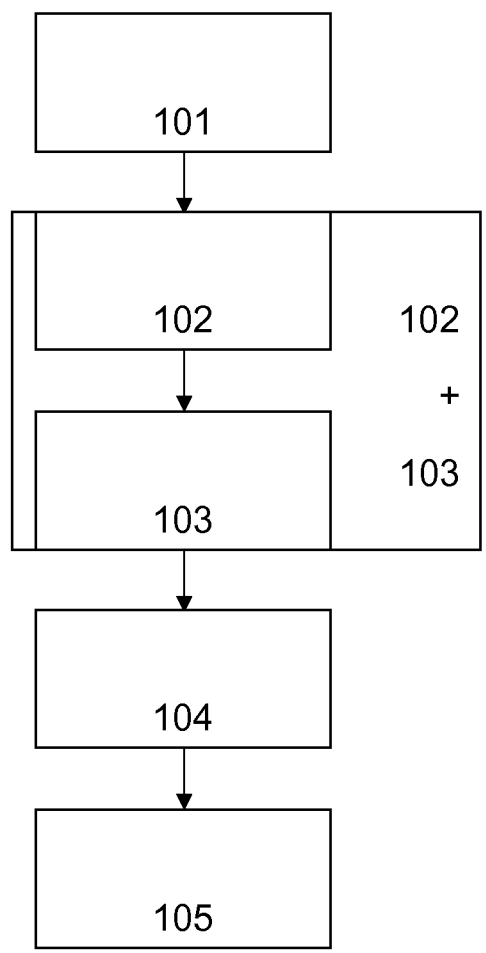

FILTER ELEMENT AND PROCESS FOR PRODUCING A FILTER ELEMENT

CROSS REFERENCE TO RELATED APPLICATIONS

This application is US Bypass Continuation of international patent application no. PCT/EP2011/062785, filed Jul. 26, 2011 designating the United States of America, the entire disclosure of which is incorporated herein by reference. Priority is claimed based on German patent application no. 10 2010 032 294.6, filed Jul. 26, 2010.

TECHNICAL FIELD

The invention concerns a hotmelt adhesive and a process for its preparation.

PRIOR ART

Non-reactive hotmelt adhesives are products that are solvent-free and are more or less hard at room temperature and in the hot state are applied onto a surfaces to be glued and upon cooling produce the adhesive connection. This group of adhesives is also known as hotmelt and is based on different chemical raw materials. DIN EN 923 defines hotmelt adhesive as a thermally meltable adhesive system that after cooling develops cohesion. Melting points of hotmelt adhesives are mostly between 80 degrees Celsius and 250 degrees Celsius. In the prior art various non-reactive hotmelt adhesives on the basis of polyesters or polyamides are known, for example, Macromelt 2030, 6208 from Henkel, WEVO T570, P 165 from WEVO Chemie, or TH 207, TH 111 from Bostik. Müller and Rath, Formulierung von Kleb- and Dichtstoffen, Hannover: Vincentz Network, 2004, disclose further hotmelt adhesives. Upon application of hotmelt adhesives, in particular when interrupting the application done by means of applicator nozzles, adhesive strings are usually formed that are produced between the applied adhesive and an applicator nozzle and that possibly may tear off (stringing).

The invention has the object to provide a non-reactive hotmelt adhesive that has minimal stringing tendency and has in particular a high thermal resistance. Moreover, the invention has the object to provide a method for preparing a hotmelt adhesive.

SUMMARY OF THE INVENTION

This object is solved by a hotmelt adhesive system comprising a hotmelt adhesive mixture, the mixture comprising 15-85% by weight, in particular 30-70% by weight, of a first hotmelt adhesive that is polyester-based, and 15-85% by weight, in particular 30-70% by weight, of a second hotmelt adhesive that is polyester-based. In this context, the sum of the components should constitute 100% of the hotmelt adhesive mixture and in particular 100% of the hotmelt adhesive system.

This hotmelt adhesive system has surprisingly the advantage that with it an in particular regularly interrupted bead-shaped application of the hotmelt adhesive, in particular by applicator nozzles, onto a substrate, in particular a fibrous substrate, e.g. of cellulose, for example, paper, is possible without, or substantially without, the formation of hotmelt adhesive strings.

The mentioned quantities with regard to the first and the second hotmelt adhesives are to be understood such that the first as well as the second hotmelt adhesive can be comprised each of several polyester-based or polyamide-based hotmelt adhesives, in particular in order to be able to provide a fine adjustment of material parameters and mechanical properties.

In one embodiment, the hotmelt adhesive mixture constitutes a proportion of more than 75% by weight, preferably more than 85% by weight, particularly preferred more than 95% by weight, in particular 100% by weight, of the hotmelt adhesive system, wherein the remainder is comprised of fillers such as chalk and/or pigments, such as titanium dioxide as a white pigment, and/or a tack-providing resin (aromatic, aliphatic or cycloaliphatic hydrocarbon resins or modified or hydrogenated versions thereof, for example, wood resin (ester) or aliphatic or alicyclic petroleum hydrocarbon resins or their hydrogenated derivatives as, for example, disclosed in WO 2007/057059 A1) and/or paraffin and/or a further hotmelt adhesive on polycondensate basis, wherein the components of the remainder are contained in particular each in a weight proportion of maximally 0-5%.

In one embodiment, the hotmelt adhesive system contains between 0-25% by weight additives or fillers that may be selected from the following additives and fillers of the basic hotmelt adhesives, namely of the first polyester-based hotmelt adhesive and the second polyamide-based hotmelt adhesive.

In one embodiment, the polyester-based hotmelt adhesive contains as an additive a carbodiimide, calcium oxide or an anhydride, in particular for improving hydrolysis resistance and/or the adhesive properties, in particular in a weight proportion of 0-5%.

In one embodiment, the polyester-based hotmelt adhesive contains as an additive a wax, in particular paraffin, and/or an oxide wax or a powder-like additive, in particular pyrogenic silica, in particular for accelerating crystallization, in particular in a weight proportion of 0-5%.

In one embodiment, the polyester-based hotmelt adhesive has a density between 1.15 and 1.35 g/cm$^3$, preferably 1.2-1.3 g/cm$^3$, particularly preferred 1.23-1.27 g/cm$^3$.

In one embodiment, the polyamide-based hotmelt adhesive has a density between 0.95 and 1 g/cm$^3$, preferably 0.97-0.99 g/cm$^3$.

In one embodiment, the polyester-based hotmelt adhesive has an elongation at break of >50%, preferably >70%, particularly preferred >90%, in particular measured according to ISO 527.

In one embodiment, the polyester-based hotmelt adhesive has a melting temperature between 150 degrees Celsius and 170 degrees Celsius, preferably between 150 degrees Celsius and 160 degrees Celsius.

In one embodiment, the polyamide-based hotmelt adhesive has a melting temperature between 150 degrees Celsius and 210 degrees Celsius, preferably between 150 degrees Celsius and 195 degrees Celsius.

In one embodiment, the polyamide-based hotmelt adhesive has a softening temperature smaller than 188 degrees Celsius, preferably smaller than 175 degrees Celsius, particularly preferred smaller than 165 degrees Celsius.

In one embodiment, the polyamide-based hotmelt adhesive has a processing temperature between 180 degrees Celsius and 230 degrees Celsius.

In one embodiment, the polyester-based hotmelt adhesive is formed of a composition of basic materials, the composition comprising (1) at least one acid, in particular phthalic acid or isophthalic acid or terephthalic acid or adipic acid or succinic acid or 6-hydroxy caproic acid or a mixture of at least two of these acids, in particular for reducing crystallinity, (2) and at least one diol, in particular 1,2-ethanediol or 1,4-butanediol or neopentyl glycol or 1,6-hexanediol or cyclohexane dimethanol or diethylene glycol or a mixture of at least two of these diols, in particular for reducing crystallinity, in particular formed by polycondensation.

In one embodiment, the polyester-based hotmelt adhesive is formed of a composition of basic materials, the composition comprising 30-50% by weight, preferably 30-45% by weight, especially preferred 30-40% by weight, of butanediol or ethanediol or a mixture thereof.

In one embodiment, the polyester-based hotmelt adhesive is formed of a composition of basic materials, the composition comprising >20% by weight, preferably >30% by weight, of terephthalic acid, in particular for reducing the stringing tendency and/or for increasing the melting point.

In one embodiment, the polyester-based hotmelt adhesive is formed of a composition of basic materials, the composition comprising <65% by weight, preferably <45% by weight, particularly preferred <35% by weight, of terephthalic acid, in particular for reducing the stringing tendency.

In one embodiment, the polyester-based hotmelt adhesive is formed of a composition of basic materials, the composition comprising >10% by weight, preferably >20% by weight, especially preferred >25% by weight, of adipic acid, in particular for reducing the melting point and/or the stringing tendency and/or lowering the viscosity and/or increasing the plasticity and/or for increasing the elongation at break.

In one embodiment, the polyester-based hotmelt adhesive is formed of a composition of basic materials, the composition comprising <40% by weight, preferably <30% by weight, of adipic acid, in particular for reducing the melting point and/or the stringing tendency and/or lowering the viscosity and/or increasing the plasticity and/or for increasing the elongation at break.

In one embodiment, the polyamide-based hotmelt adhesive is formed of a composition of basic materials, the composition comprising (1) at least one acid, in particular adipic acid or azelaic acid or sebacic acid or dimerized fatty acid or a mixture of at least two of these acids, (2) and at least one amine, in particular ethylene diamine or hexamethylene diamine or 2,2,4-trimethyl hexamethylene diamine or ε-caprolactam or 1-amino-3-aminomethyl-3,5,5-trimethyl cyclohexane (isophorone diamine) or piperazine or a mixture of at least two of these amines, in particular formed by polycondensation.

In one embodiment, the polyamide-based hotmelt adhesive is formed of a composition of basic materials, the composition comprising 50-90% by weight, preferably 60-80% by weight, particularly preferred 60-70% by weight, of ε-caprolactam or hexamethylene diamine or 2,2,4-trimethyl-hexamethylene diamine or a mixture of at least two of these amines.

In one embodiment, the polyamide-based hotmelt adhesive is formed of a composition of basic materials, the composition comprising >5% by weight, preferably >10% by weight, particularly preferred >15% by weight, of adipic acid, in particular for improving the thermal resistance and/or for reducing the stringing tendency and/or for increasing the elongation at break.

In one embodiment, the polyamide-based hotmelt adhesive is comprised of a composition of basic materials, the composition comprising <30% by weight, preferably <25% by weight, of adipic acid, in particular for improving the resistance to thermal distortion and/or for reducing the stringing tendency.

In one embodiment, the polyamide-based hotmelt adhesive is formed of a composition of basic materials, the composition comprising and <30% by weight, preferably <25% by weight, of sebacic acid, in particular for improving the resistance to thermal distortion and/or for reducing the stringing tendency.

In one embodiment, the total proportion of adipic acid in the basic materials of the polyamide-based hotmelt adhesive and of the polyester-based hotmelt adhesive is >5% by weight, preferably >10% by weight, particularly preferred >15% by weight and at the same time <35% by weight, preferably <30% by weight and particularly preferred <25% by weight, in particular for improving the resistance to thermal distortion and/or for reducing the stringing tendency.

In one embodiment, the hotmelt adhesive system comprises a hotmelt adhesive mixture, the mixture comprising (1) between 30 and 70% by weight, preferably 40-60% by weight, especially 45-55% by weight, of a first polyester-based hotmelt adhesive, (2) between 30 and 70% by weight, preferably 40-60% by weight, especially 45-55% by weight, of a second polyamide-based hotmelt adhesive, wherein the hotmelt adhesive system is formed in particular completely of the hotmelt adhesive mixture and the latter is formed in particular completely of the first and the second hotmelt adhesives.

In one embodiment, the hotmelt adhesive system is foamed with a gas, in particular nitrogen, air, $CO_2$, or the like.

The adhesive beads that are formed with the foamed adhesive system have preferably a closed surface.

The method for preparing the hotmelt adhesive system according to the invention comprises the steps (1) melting a first hotmelt adhesive that is polyester-based and a second hotmelt adhesive that is polyamide-based, in particular in a composition according to the invention and quantity ratios according to the invention, (2) in particular dynamically mixing the two hotmelt adhesives, in particular by producing shearing forces in the melt, to a hotmelt adhesive mixture, wherein in particular a hotmelt adhesive according to the invention is formed.

This has the advantage that a hotmelt adhesive can be produced with a reduced stringing tendency.

In one embodiment of both methods, the granular materials of both hotmelt adhesives are mixed before heating and subsequently heated and melted.

In one embodiment of both methods, mixing, heating and melting of the hotmelt adhesives is carried out in an extruder.

This has the advantage that an excellent mixing of the hotmelt adhesives is achieved close to the application site.

In one embodiment, the molten hotmelt adhesive system is foamed with a gas, in particular nitrogen, air, $CO_2$, or the like.

In one embodiment of the method, as a final step, in particular without intermediate cooling, a bead-shaped regularly or irregularly interrupted application onto a flat, in particular, fibrous substrate is carried out.

In this context, it is advantageous that the application is realized only a few minutes (in particular 0-5 minutes) after the mixing action in order to keep separation of the components as low as possible.

EMBODIMENT(S) OF THE INVENTION

The following examples illustrate procedures according to the invention or qualitative procedures used for comparison.

Example 1

A polyester hotmelt adhesive (Sika SikaMelt 9120) with a density of 1.25 g/cm$^3$ and an elongation at break of in the range of 75-115% and a polyamide hotmelt adhesive (Henkel Macromet 6208) with a density of 0.98 g/cm$^3$ are heated separately with mixing to processing temperature (200 degrees Celsius). The stringing tendency is qualitatively determined in that a round metal rod of 1 mm diameter is immersed in the melt and pulled out suddenly. In Example 1, for both hotmelt adhesives a hotmelt adhesive droplet remains on the round metal rod on which directly after pulling out from the melt there remains a hotmelt adhesive string which cools and hardens. A remaining hardened string is recognizable. The stringing tendency is therefore determined to be high. Moreover, the granular material of the two aforementioned hotmelt adhesives is mixed and the mixed granular material is heated in an extruder to 200 degrees Celsius and melted jointly and further mixed. Immediately thereafter, in order to keep separation at a minimum, application onto a flat medium is carried out by means of an applicator nozzle that is coupled directly with a gear pump. When doing so, a surprisingly reduced formation of strings is observed in comparison to the use of the two hotmelt adhesives in separate form. Also, the stringing tendency of the hotmelt adhesive mixture is qualitatively determined in such a way that a round metal rod of 1 mm diameter is immersed into the melt, that has been dynamically mixed again prior to this in a porcelain dish that has been heated to processing temperature, and pulled out suddenly. A hotmelt adhesive droplet remains on the round metal rod into which the string, that has formed directly after pulling out the metal rod from the melt, will pull back. There is no remaining string recognizable. The stringing tendency is therefore determined to be minimal.

Example 2

In the same weight proportions a polyester hotmelt adhesive with a melting point of 150-160 degrees Celsius, substantially formed of 40% by weight butanediol, 33% by weight terephthalic acid, 27% by weight adipic acid, and a polyamide hotmelt adhesive with a melting point at 130 degrees Celsius, formed of 67% by weight of ε-caprolactam, 5% by weight of 2,2,4-trimethyl hexamethylene diamine, 12% by weight of 1-amino-3-aminomethyl-3,5,5-trimethyl cyclohexane and 16% by weight of adipic acid are mixed in granular form and melted jointly with dynamic mixing.

The stringing tendency is determined qualitatively such that a round metal rod of 1 mm diameter is immersed into the melt and pulled out suddenly. In Example 2, a hotmelt adhesive droplet remains on the round metal rod into which the string, that is formed directly after pulling out the metal rod from the melt, pulls back. A remaining string is not recognizable. The stringing tendency is therefore determined to be minimal.

Example 3

The polyester hotmelt adhesive (Sika Sikamelt 9420) with an elongation at break of approximately 50-60% and an adipic acid contents of approximately 9% by weight is mixed in weight proportions of 60:40, 65:35, 70:30 (the polyester hotmelt adhesive is mentioned first in each case) with a polyamide hotmelt adhesive (Henkel Macromet 6208) with a melting temperature between 188 and 195 degrees Celsius and a density of 1.02 g/cm$^3$ and is tested with regard to stringing tendency.

In Example 3 a hotmelt adhesive droplet remains on the round metal rod into which the string, that is formed immediately after pulling out the round metal rod from the melt, pulls back completely or partially, depending on the mixing ratio. The effect is here significantly less pronounced than in the application of the two hotmelt adhesives when used separately.

Example 4

The polyester hotmelt adhesive of Example 2 and a polyamide hotmelt adhesive with a density of 0.97 g/cm$^3$, a softening point of 190-205 degrees Celsius (Henkel Macromet 2035) are mixed in weight ratios of 30:70, 50:50, and 70:30 in analogy to Example 1 and tested. In Example 4, a hotmelt adhesive droplet remains on the round metal rod into which the string, that is formed immediately after pulling out the round metal rod from the melt, will pull back. A remaining string is not recognizable or significantly smaller than in the application of the two hotmelt adhesives when used separately, wherein the stringing tendency increases again beginning at a weight proportion of 70% of the aforementioned polyester adhesive. The stringing tendency is therefore determined to be minimal.

BRIEF DESCRIPTION OF THE DRAWING(S)

In FIG. 1 an embodiment of the sequence of a method according to the invention for producing a hotmelt adhesive system is shown.

The method for producing the hotmelt adhesive system according to the invention comprises in one embodiment the steps:

(101) mixing the granular materials of the two hotmelt adhesives before heating, (102) melting the first hotmelt adhesive that is polyester-based and the second hotmelt adhesive that is polyamide-based, in particular in a composition according to the invention and quantity ratios according to the invention, for example, in a melting device with reservoir, (103) in particular dynamically mixing the two hotmelt adhesives, in particular by producing shearing forces in the melt to a hotmelt adhesive mixture, for example, with a stirring device or a conveying device with worm conveyors or gears, wherein the steps 102 and 103 are however preferably performed simultaneously as step (102+103) in an extruder, (104) optionally foaming the molten hotmelt adhesive system with a gas, in particular nitrogen, air, CO$_2$ or the like, (105) optionally, in a final step, bead-shaped, in particular regularly or irregularly interrupted, application onto a flat, in particular fibrous substrate, in particular without intermediate cooling, in particular only 0-5 minutes after mixing, so that an expanded method for producing and for applying a hotmelt adhesive system is created.

The invention claimed is:

1. A hotmelt adhesive system comprising at least one hotmelt adhesive mixture, the hotmelt adhesive mixture comprising
   a) 15-85% by weight of a first hotmelt adhesive that is polyester-based;

b) 15-85% by weight of a second hotmelt adhesive that is polyamide-based;
wherein weight proportions of the first and the second hotmelt adhesives together constitute 100% by weight of the hotmelt adhesive mixture;
wherein the hotmelt adhesive mixture constitutes a proportion of more than 75% by weight of the hotmelt adhesive system, wherein the remainder is comprised of fillers including chalk and/or pigments, including titanium dioxide as a white pigment, and/or a tack-providing resin and/or at least one further hotmelt adhesive on polycondensate basis;
wherein the polyester-based hotmelt adhesive has a melting point between 150 degrees Celsius and 170 degrees Celsius and
the polyamide-based hotmelt adhesive has a melting point between 180 degrees Celsius and 210 degrees Celsius.

2. A hotmelt adhesive system comprised of a hotmelt adhesive mixture, the hotmelt adhesive mixture comprising
 a. 15-85% by weight of a first hotmelt adhesive that is polyester-based,
 b. 15-85% by weight of a second hotmelt adhesive that is polyamide-based,
wherein weight proportions of the first and the second hotmelt adhesives together constitute 100% by weight of the hotmelt adhesive mixture;
wherein the polyester-based hotmelt adhesive has a melting point between 150 degrees Celsius and 170 degrees Celsius; and
the polyamide-based hotmelt adhesive has a melting point between 180 degrees Celsius and 210 degrees Celsius.

3. The hotmelt adhesive system according to claim 2, wherein the polyester-based hotmelt adhesive has a density between 1.15 and 1.35 g/cm3 and the polyamide-based hotmelt adhesive has a density between 0.95 and 1 g/cm3.

4. The hotmelt adhesive system according to claim 2, wherein
the polyester-based hotmelt adhesive has an elongation at break of >50%.

5. The hotmelt adhesive system according to claim 2, wherein
the polyester-based hotmelt adhesive is formed of a composition of basic materials, the composition comprising
 a) at least one acid selected from the group: phthalic acid, isophthalic acid, terephthalic acid, adipic acid, succinic acid, 6-hydroxy caproic acid or a mixture of at least two of these acids;
 b) and at least one diol selected from the group: 1,2-ethanediol, 1,4-butanediol, neopentyl glycol, 1,6-hexanediol, cyclohexane dimethanol, diethylene glycol or a mixture of at least two of these diols.

6. The hotmelt adhesive system according to claim 2, wherein
the polyester-based hotmelt adhesive is formed of a composition of basic materials, the composition comprising 30-50% by weight of butanediol or ethanediol or a mixture thereof.

7. The hotmelt adhesive system according to claim 2, wherein
the polyester-based hotmelt adhesive is formed of a composition of basic materials, the composition comprising >20% by weight of terephthalic acid.

8. The hotmelt adhesive system according to claim 2, wherein
the polyester-based hotmelt adhesive is formed of a composition of basic materials, the composition comprising <65% by weight of terephthalic acid.

9. The hotmelt adhesive system according to claim 2, wherein
the polyester-based hotmelt adhesive is formed of a composition of basic materials, the composition comprising a weight proportion of adipic acid, the weight proportion being >5% by weight and <40% by weight.

10. The hotmelt adhesive system according to claim 2, wherein
the polyamide-based hotmelt adhesive is formed of a composition of basic materials, the composition comprising
 a) at least one acid selected from the group: adipic acid, azelaic acid, sebacic acid, dimerized fatty acid or a mixture of at least two of these acids;
 b) and at least one amine selected from the group: ethylene diamine, hexamethylene diamine, 2,2,4-trimethyl hexamethylene diamine, ϵ-caprolactam, 1-amino-3-aminomethyl-3,5,5-trimethyl cyclohexane, isophorone diamine, piperazine or a mixture of at least two of these amines.

11. The hotmelt adhesive system according to claim 2, wherein
the polyamide-based hotmelt adhesive is formed of a composition of basic materials, the composition comprising 50-90% by weight of ϵ-caprolactam or hexamethylene diamine or 2,2,4-trimethyl-hexamethylene diamine or a mixture of at least two of these amines.

12. The hotmelt adhesive system according to claim 2, wherein
the polyamide-based hotmelt adhesive is formed of a composition of basic materials, the composition comprising a proportion of adipic acid, the proportion being >5% by weight, and <30% by weight.

13. The hotmelt adhesive system according to claim 2, wherein
the total proportion of adipic acid in the basic materials of the polyamide-based hotmelt adhesive and of the polyester-based hotmelt adhesive is >5% by weight and at the same time <35% by weight.

* * * * *